W. T. DREW.
PROVING GLASS FOR OPEN TOP GAS METERS.
APPLICATION FILED JAN. 29, 1908.
913,710.  Patented Mar. 2, 1909.
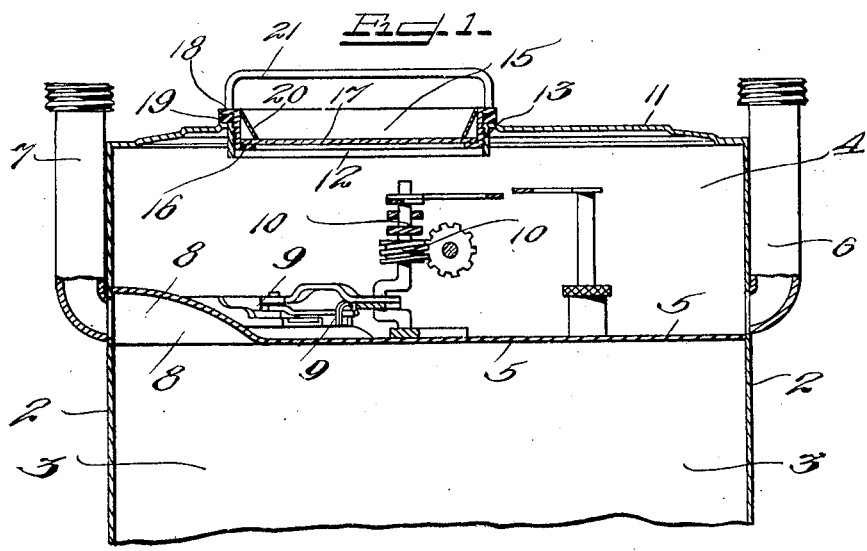
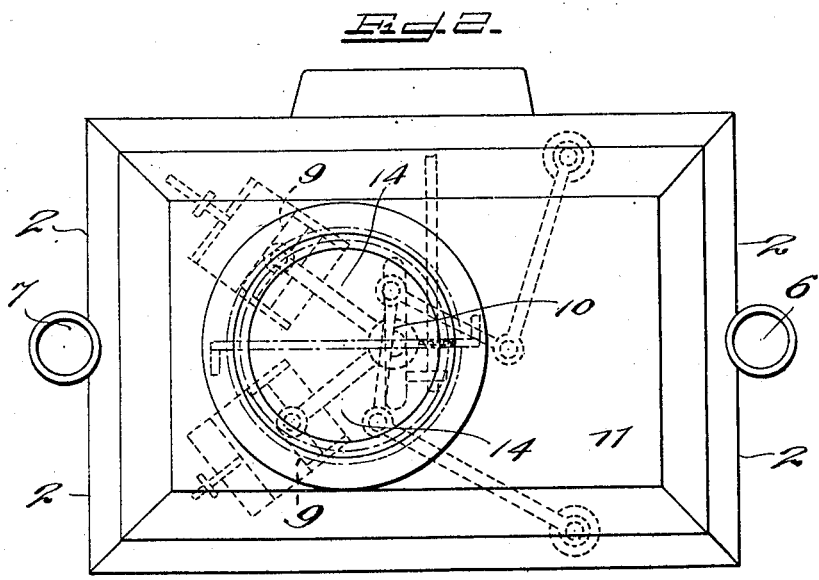
WITNESSES:
INVENTOR
William T. Drew
BY
Mastick & Jones
his ATTORNEYS

UNITED STATES PATENT OFFICE.

WILLIAM T. DREW, OF NEW YORK, N. Y., ASSIGNOR TO NEW YORK IMPROVED METER COMPANY, OF NEW YORK, N. Y., A CORPORATION OF NEW YORK.

PROVING-GLASS FOR OPEN-TOP GAS-METERS.

No. 913,710.   Specification of Letters Patent.   Patented March 2, 1909.

Application filed January 29, 1908. Serial No. 413,255.

*To all whom it may concern:*

Be it known that I, WILLIAM T. DREW, a citizen of the United States, residing at New York city, in the county of New York and State of New York, have invented a certain new and useful Improvement in Proving-Glasses for Open-Top Gas-Meters, of which the following is a specification.

The invention relates to an improvement in proving glasses for open top gas meters.

In the more ordinary form of gas meter, in which a part of the gallery is sealed against gas, the lower portion of the gallery being provided with a gas box and a gas channel leading thereto from the gas inlet pipe, when it is desired to adjust or prove the registering mechanism, the tin top, which is soldered on, is removed, exposing such mechanism for ready adjustment, no gas escaping as such mechanism is in the portion of the gallery sealed from the gas. In the open top gas meter, the gas box and gas channel are omitted, the gallery, containing the registering mechanism, acting as a gas reservoir. Hence when the tin top is removed the gas would rush out unless means were taken to prevent it. As it is necessary, in proving the meter, not only to seal against gas escaping but also to provide means for observing the mechanism while the meter is being proved, it has been the practice to replace the tin top with a glass plate covering the entire top of the meter and sealed at its edges to the meter by putty. Every time the mechanism has to be adjusted this glass plate has to be removed and again sealed. As such proving usually requires four or five adjustments this operation takes time and if there are many meters to be proved, a large number of men must be employed to do the work. When the proving is completed the tin top is replaced and sealed to the meter by solder.

It is the object of the invention to provide means to facilitate this operation of proving open top gas meters so that more meters may be proved in less time and with less labor.

In the following is described, in connection with the accompanying drawings, one embodiment of the invention, the features thereof being more particularly pointed out hereinafter in the claims.

In the drawings Figure 1 is an elevation of an open top gas meter showing the application of one form of my invention thereto, parts being shown in section and parts being removed. Fig. 2 is a top plan view of the same, sealed for use, the registering mechanism being shown in dotted lines.

Similar numerals of reference indicate similar parts throughout the several views.

2 indicates the meter proper having a chamber 3, in which are the diaphragms (not shown), and a gallery 4, the two parts of the meter being separated by a suitable table 5. Inlet pipe 6 communicates directly with gallery 4 and outlet pipe 7 with gas box 8. Valves 9, 9, form the means of communication between chamber 3 and gallery 4, and between chamber 3 and gas box 8.

The registering mechanism is indicated at 10 and it is the adjustment or proving the correctness of adjustment of this mechanism which is meant by the term "proving the meter."

11 indicates a tin top soldered at its edges to the rim of meter 2. An opening 12 is provided in top 11 immediately above mechanism 10 and of a size sufficient to permit ready access thereto. A screw ring 13, either made separately and soldered in or spun integrally with top 11, is provided at the periphery of opening 12. Opening 12 is closed by a tin cap 14, soldered in place when the meter is in use.

When the meter is to be proved the cap 14 is removed, the adjustment of mechanism 10 made and a screw cover 15, screwed into ring 13. Screw cover 15 is provided with a flange 16 for holding a glass plate 17 and a flange 18 to act as a seat for gasket 19 interposed between top 11 and said flange. Plate 17 is suitably sealed to flange 16 and is preferably further held in place by ring 20 soldered at the top to the inner periphery of screw cover 15 and at its bottom bearing on plate 17.

21 indicates a handle for readily screwing and unscrewing cover 15 from its seat.

The workman proving the meter can observe the operation of mechanism 10 through plate 17 and as it becomes necessary to adjust the same can quickly and easily unscrew cover 15, make the adjustment and screw cover 15 in place again. When the meter has been proved the tin cap 14 is again soldered in place and the meter is ready for use.

It is obvious that the details shown may be varied without departing from the spirit of the invention.

What I claim and desire to secure by Letters Patent is:

1. In an open top gas meter, a top plate sealed to the meter and provided with an aperture adapted to be ultimately closed by a sealing plate, a proving glass adapted to temporarily close said aperture and means for sealing said proving glass in said top plate.

2. In an open top gas meter, a top plate sealed to the meter and provided with an aperture adapted to be ultimately closed by a sealing plate, a proving glass adapted to temporarily close said aperture, means for engaging and disengaging the proving glass and the top plate and means for sealing said proving glass in said top plate.

In testimony whereof I have hereunto signed my name in the presence of two subscribing witnesses.

WILLIAM T. DREW.

Witnesses:
   SEABURY C. MASTICK,
   K. G. LEARD.